US008658728B2

(12) United States Patent
Ichikawa et al.

(10) Patent No.: US 8,658,728 B2
(45) Date of Patent: Feb. 25, 2014

(54) NATURAL RUBBER AND METHOD FOR PRODUCING THE SAME, RUBBER COMPOSITION AND PNEUMATIC TIRE USING THE SAME, MODIFIED NATURAL RUBBER AND METHOD FOR PRODUCING THE SAME, AND RUBBER COMPOSITION FOR TREAD OR FOR COVERING CARCASS CORD AND PNEUMATIC TIRE USING THE SAME

(75) Inventors: Naoya Ichikawa, Kobe (JP); Toshiaki Sakaki, Kobe (JP); Sumiko Miyazaki, Kobe (JP); Tomohiro Hosokawa, Kobe (JP); Ai Matsuura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/139,536

(22) PCT Filed: Dec. 14, 2009

(86) PCT No.: PCT/JP2009/070824
§ 371 (c)(1),
(2), (4) Date: Jun. 14, 2011

(87) PCT Pub. No.: WO2010/071106
PCT Pub. Date: Jun. 24, 2010

(65) Prior Publication Data
US 2011/0253285 A1 Oct. 20, 2011

(30) Foreign Application Priority Data

Dec. 15, 2008 (JP) ................................ 2008-318710
Dec. 15, 2008 (JP) ................................ 2008-318711
Jan. 30, 2009 (JP) ................................ 2009-019711

(51) Int. Cl.
*C08K 3/04* (2006.01)
*C08K 5/00* (2006.01)

(52) U.S. Cl.
USPC .......................................... 524/495; 524/515

(58) Field of Classification Search
USPC ........................................................ 524/495
See application file for complete search history.

(56) References Cited

U.S. PATENT DOCUMENTS 5,396,940 A 3/1995 Segatta et al.
5,569,740 A * 10/1996 Tanaka et al. .............. 528/502 F
2004/0110889 A1 6/2004 Yagi et al.
2004/0266937 A1 * 12/2004 Yagi et al. ..................... 524/493
2006/0252879 A1 * 11/2006 Tanaka et al. ................. 524/571
2009/0088496 A1 4/2009 Miyasaka et al.

FOREIGN PATENT DOCUMENTS

| CN | 1572825 A | 2/2005 |
|---|---|---|
| CN | 1946744 A | 4/2007 |
| EP | 1 484 359 A1 | 12/2004 |
| EP | 1 568 713 A1 | 8/2005 |
| EP | 1 652 862 A1 | 5/2006 |
| EP | 1 816 144 A1 | 8/2007 |
| JP | 6-329702 A | 11/1994 |
| JP | 6-329838 A | 11/1994 |
| JP | 7-149955 A | 6/1995 |
| JP | 8-12814 A | 1/1996 |
| JP | 11-12306 A | 1/1999 |
| JP | 3294901 B2 | 6/2002 |
| JP | 2004-182905 A | 7/2004 |
| JP | 2004-250546 A | 9/2004 |
| JP | 2004-359773 A | 12/2004 |
| JP | 2005-41960 A | 2/2005 |
| JP | 2005-82622 A | 3/2005 |
| JP | 2005082622 A * | 3/2005 |
| JP | 2006-152045 A | 6/2006 |
| JP | 2006-152171 A | 6/2006 |
| JP | 2006-307018 A | 11/2006 |
| JP | 2007-145898 A | 6/2007 |
| JP | 2008-106099 A | 5/2008 |
| WO | WO 2005/012365 A1 | 2/2005 |

OTHER PUBLICATIONS

International Search Report, PCT/JP2009/070824, Mar. 9, 2010.
Japanese Office Action, dated Mar. 9, 2010, for Japanese Application No. 2008-318710.
Japanese Office Action, dated Mar. 9, 2010, for Japanese Application No. 2008-318711.
Japanese Office Action, dated Mar. 9, 2010, for Japanese Application No. 2009-019711.
Machine generated English translation of JP-2006-152171-A, dated Jun. 15, 2006.
Machine generated English translation of JP-2006-307018-A, dated Nov. 9, 2006.
Machine generated English translation of JP-2008-106099-A, dated May 8, 2008.
Machine generated English translation of JP-6-329702-A, dated Nov. 29, 1994.
Database WPI Week 200570 Thomson Scientific, London, GB; AN 2005-684076 (XP-002673748).

* cited by examiner

*Primary Examiner* — Hui Chin
(74) *Attorney, Agent, or Firm* — Birch, Stewart, Kolasch & Birch, LLP

(57) ABSTRACT

The present invention relates to a natural rubber that contains 200 ppm or less of phosphorus.

38 Claims, No Drawings

NATURAL RUBBER AND METHOD FOR PRODUCING THE SAME, RUBBER COMPOSITION AND PNEUMATIC TIRE USING THE SAME, MODIFIED NATURAL RUBBER AND METHOD FOR PRODUCING THE SAME, AND RUBBER COMPOSITION FOR TREAD OR FOR COVERING CARCASS CORD AND PNEUMATIC TIRE USING THE SAME

TECHNICAL FIELD

The present invention relates to a natural rubber and a method for producing the natural rubber, a rubber composition and a pneumatic tire using the rubber composition, a modified natural rubber and a method for producing the modified natural rubber, and a rubber composition for a tread or for covering a carcass cord and a pneumatic tire using the rubber composition for a tread and/or the rubber composition for covering a carcass cord.

BACKGROUND ART

Natural rubber is used for various products including industrial products such as tires, belts, and rollers, and sports products such as tennis balls. A rubber product is generally subjected to compression, recovery, and elongation repeatedly when used, which results in accumulation of loss energy to generate heat. The heat promotes rubber fatigue and thus shortens the life of the rubber product. A larger amount of the loss energy represented by loss tangent, tan $\delta$, leads to a higher heat generation. Further, the rolling resistance of a tire is empirically known to be dependent on the value of tan $\delta$ at 50° C. to 70° C. This means that there are problems that a large value of tan $\delta$ causes an increase in not only heat generation but also in rolling resistance, and thus causes a decrease in fuel economy of a vehicle. Accordingly, it is desirable for a tread of a fuel-saving tire to have a small value of tan $\delta$ at 50° C. to 70° C.

Some Patent Documents disclose methods for reducing the protein and gel contents in natural rubber to decrease the value of tan $\delta$ of a rubber composition. For example, Patent Document 1 discloses a method of soaking solid natural rubber swollen with a solvent into an alkali hydroxide solution. Patent Document 2 discloses a method of removing magnesium phosphate by adding a phosphate to natural rubber latex. Patent Document 3 discloses a method of adding a protease and a surfactant to natural rubber latex and aging the latex. Patent Document 4 discloses a method of adding a surfactant to natural rubber latex and performing a washing treatment.

These methods can reduce the protein and gel contents to some extent, but not to a sufficient level. Also, deproteinization usually can reduce the protein content, but cannot sufficiently remove, particularly, phospholipids which are thought to be one of the factors of gel formation in natural rubber.

Meanwhile, natural rubber is usually modified in a latex state stabilized with a surfactant in consideration of the cost and the ease of handling, but is occasionally modified in a solid rubber state or in a rubber solution. However, natural rubber latex usually contains about 5% of a non-rubber component such as protein. Commercially available concentrated latex also contains about 3% of a non-rubber component. As a result, the non-rubber component, particularly protein, inhibits modification of natural rubber. This, for example, decreases the degree of grafting and grafting efficiency in graft copolymerization, which does not result in achievement of a high degree of modification and high modification efficiency.

In order to achieve high modification efficiency in that case, deproteinizing latex has been investigated. For example, Patent Documents 5 and 6 disclose a method of adding a protease to latex to degrade protein, and a method for producing a modified natural rubber by epoxidizing a deproteinized natural rubber that is produced by repeatedly washing latex with a surfactant. These methods can reduce the protein content to some extent. However, these methods cannot sufficiently remove phospholipids that are one of the factors inhibiting the modification of natural rubber, and there is still room for improvement.

Furthermore, there has been an approach to decrease rolling resistance of a tire to suppress heat generation and thus achieve fuel economy of a vehicle. The demand for achieving fuel economy of a vehicle from the aspect of tires has increased in recent years. The demand is particularly large for achieving fuel economy from the aspect of improvement of a tread which occupies a larger part of a tire than other tire components. Examples of known methods for achieving low heat build-up property of a rubber composition include a method of using a low-reinforcing filler, and a method of reducing the reinforcing filler content. Also, an attempt has been made to achieve fuel economy by using silica as a filler so as to decrease rolling resistance.

The above methods for achieving fuel economy from the aspect of the fillers decrease the hardness of the rubber composition, which softens the tire and problematically decreases the abrasion resistance. Hence, it is difficult to achieve both high fuel economy (low rolling resistance) and high abrasion resistance.

Those vehicle tires are subjected to a heavy load, and therefore the tires usually have carcass cords such as steel cords as reinforcements. The carcass cord can, however, be separated from the rubber composition particularly as a result of heat build-up of the tire while the vehicle is running, which can cause crucial tire failure. Hence, a rubber composition for covering a carcass cord needs to have high rubber strength and high adhesion to the carcass cord.

Rubber compositions for covering a carcass cord that have been used up until now contain natural rubber (NR) and/or isoprene rubber (IR) and emulsion-polymerized styrene butadiene rubber (E-SBR) as a rubber component, and contain carbon black as a reinforcing filler. This has led to a problem of poor fuel economy. In order to increase fuel economy, silica is generally used as a reinforcing filler in place of carbon black. Here, use of silica, however, decreases the required adhesion of the rubber composition for covering a carcass cord to the carcass cord, which makes it difficult to achieve both sufficient adhesion and high fuel economy (low rolling resistance).

In view of the above problem, Patent Document 7 discloses a method for achieving both sufficient fuel economy and adhesion by using a solution-polymerized styrene butadiene rubber containing a modified group that interacts with silica. However, only styrene butadiene rubber among diene rubbers is studied in the document, and natural rubber is not studied.

Natural rubber has a higher Mooney viscosity than those of other synthetic rubbers and thus has lower processability. Therefore, natural rubber is usually added with a peptizer and then masticated so that the rubber has a decreased Mooney viscosity before being used. Requirement of such a process in the case of using natural rubber decreases the productivity. Further, mastication causes molecular chain scission in natural rubber, thereby leading to a loss of the properties of a high-molecular weight polymer that natural rubber essentially has (for example, high abrasion resistance, fuel economy, and rubber strength).

Natural rubber latex is sap extracted from hevea trees and contains components such as water, protein, lipids, and inorganic salts as well as a rubber component. There is a report that removing protein contained in natural rubber improves the processability of the rubber. Some Patent Documents disclose methods for reducing the content of protein or another component in natural rubber. For example, Patent Document 1 discloses a method of soaking solid natural rubber swollen with a solvent into an alkali hydroxide solution. Patent Document 2 discloses a method of removing magnesium phosphate by adding a phosphate to natural rubber latex. Patent Documents 3 and 8 disclose a method of adding a protease and a surfactant to natural rubber latex and aging the latex. Patent Document 9 discloses a method of adding a surfactant to natural rubber latex and performing a washing treatment.

The methods disclosed in Patent Documents 1 to 3, 8, and 9 can remove some components such as protein to some extent, but not to a sufficient level. Also, there is a problem that these methods can hardly remove some components such as phospholipids. Further, studies have not been done on application of the natural rubber produced by these methods for a tire tread or a rubber composition for covering a carcass cord.

Patent Document 1: JP H11-012306 A
Patent Document 2: JP 2004-250546 A
Patent Document 3: JP 2005-082622 A
Patent Document 4: JP H06-329838 A
Patent Document 5: JP 2004-359773 A
Patent Document 6: JP 2005-041960 A
Patent Document 7: JP 2007-145898 A
Patent Document 8: JP H08-012814 A
Patent Document 9: JP 3294901 B

SUMMARY OF THE INVENTION

The present invention aims to provide a natural rubber that solves the above problems, has excellent processability, and contributes to improvement of fuel economy of a tire; a rubber composition containing the natural rubber; and a tire that achieves low heat build-up and low rolling resistance.

The present invention also aims to provide a modified natural rubber that solves the above problems and has an excellent degree of modification; and a method for producing modified natural rubber at high modification efficiency.

Further, the present invention aims to provide a rubber composition for a tire tread, which solves the above problems and can achieve both high fuel economy (low rolling resistance) and high abrasion resistance while having processability excellent enough to eliminate the need for mastication. It is also an aim of the present invention to provide a pneumatic tire having a tread that is made with the above rubber composition.

Furthermore, the present invention aims to provide a rubber composition for covering a carcass cord, which improves the adhesion to the carcass cord and can achieve both high fuel economy (low rolling resistance) and high rubber strength while having processability excellent enough to eliminate the need for mastication. It is also an aim of the present invention to provide a pneumatic tire having a carcass that is made with the above rubber composition.

The present invention relates to a natural rubber that contains 200 ppm or less of phosphorus.

The natural rubber preferably contains 20% by mass or less of gel that is determined as a toluene-insoluble matter.

The natural rubber preferably shows no peak corresponding to phospholipids between −3 ppm and 1 ppm in a $^{31}$P-NMR spectrum of a chloroform extract thereof and thus substantially contains no phospholipids.

The natural rubber preferably contains 0.3% by mass or less of nitrogen.

The natural rubber preferably contains 0.15% by mass or less of nitrogen.

The present invention also relates to a method for producing a natural rubber, including the steps of:
saponifying natural rubber latex with an alkali;
washing a rubber coagulated therefrom after the saponification; and
drying the rubber,
wherein these steps are completed within 15 days after extraction of the natural rubber latex.

In the method for producing a natural rubber, the phosphorus content in the natural rubber from the natural rubber latex is preferably reduced to 200 ppm or less by removing a phosphorus compound separated in the saponification through washing.

In the method for producing a natural rubber, the natural rubber preferably contains 20% by mass or less of gel that is determined as a toluene-insoluble matter.

In the method for producing a natural rubber, the natural rubber preferably contains 0.3% by mass or less of nitrogen.

In the method for producing a natural rubber, the natural rubber preferably contains 0.15% by mass or less of nitrogen.

The present invention also relates to a rubber composition containing the above natural rubber and a vulcanizing agent.

The present invention also relates to a pneumatic tire produced using the above rubber composition.

The present invention also relates to a modified natural rubber, which is modified by graft-copolymerizing a natural rubber containing 200 ppm or less of phosphorus therein with an organic compound that has an unsaturated bond.

The present invention also relates to a modified natural rubber, which is modified by addition-reacting an organic compound with a natural rubber that contains 200 ppm or less of phosphorus.

The present invention also relates to a modified natural rubber, which is modified by epoxidizing a natural rubber that contains 200 ppm or less of phosphorus.

The above natural rubber containing 200 ppm or less of phosphorus is preferably produced by saponifying natural rubber latex.

The modified natural rubber preferably shows no peak corresponding to phospholipids between −3 ppm and 1 ppm in a $^{31}$P-NMR spectrum of a chloroform extract thereof and thus substantially contains no phospholipids.

The present invention also relates to a method for producing the above modified natural rubber, the method including the steps of:
removing a phosphorus compound in natural rubber latex to produce a natural rubber containing 200 ppm or less of phosphorus; and
graft-copolymerizing the produced natural rubber with an organic compound that has an unsaturated bond.

The present invention also relates to a method for producing the above modified natural rubber, the method including the steps of:
removing a phosphorus compound in natural rubber latex to produce a natural rubber containing 200 ppm or less of phosphorus; and addition-reacting an organic compound with the produced natural rubber.

The present invention also relates to a method for producing the above modified natural rubber, the method including the steps of:

removing a phosphorus compound in natural rubber latex to produce a natural rubber containing 200 ppm or less of phosphorus; and epoxidizing the produced natural rubber.

In the above methods for producing the modified natural rubber, the removal of a phosphorus compound is preferably achieved by saponification of the natural rubber latex.

The present invention also relates to a rubber composition for a tire tread, containing:

a rubber component with 5% by mass or more of a natural rubber that contains 200 ppm or less of phosphorus, and carbon black and/or a white filler.

The natural rubber preferably contains 0.3% by mass or less of nitrogen.

The natural rubber preferably contains 0.15% by mass or less of nitrogen.

The natural rubber preferably contains 20% by mass or less of gel that is determined as a toluene-insoluble matter.

The natural rubber is preferably produced by saponifying natural rubber latex.

The white filler is preferably silica.

The present invention also relates to a method for producing the rubber composition for a tire tread, the method excluding the step of masticating natural rubber.

The present invention also relates to a pneumatic tire having a tread made with the rubber composition for a tire tread.

The present invention also relates to a rubber composition for covering a carcass cord, containing:

a rubber component with 5% by mass or more of a natural rubber that contains 200 ppm or less of phosphorus, and carbon black and/or a white filler.

The natural rubber preferably contains 0.3% by mass or less of nitrogen.

The natural rubber preferably contains 0.15% by mass or less of nitrogen.

The natural rubber preferably contains 20% by mass or less of gel that is determined as a toluene-insoluble matter.

The natural rubber is preferably produced by saponifying natural rubber latex.

The white filler is preferably silica.

The natural rubber is preferably contained in an amount of 60 to 100% by mass in 100% by mass of the rubber component.

The rubber composition preferably contains 4 to 15 parts by mass of zinc oxide per 100 parts by mass of the rubber component.

The present invention also relates to a method for producing the rubber composition for covering a carcass cord, the method excluding the step of masticating natural rubber.

The present invention also relates to a pneumatic tire having a carcass made with the rubber composition for covering a carcass cord.

The present invention provides a natural rubber from which phosphorus compounds, essentially contained in natural rubber, are removed as much as possible by saponifying and washing fresh natural rubber latex. Accordingly, the rubber composition containing the above natural rubber (hereinafter also referred to as the rubber composition of the present invention) has excellent non-conventional properties including the following: a small value of tan $\delta$ at 50° C. to 70° C.; excellent reduction of the heat build-up and the rolling resistance; high strength; improved tear resistance; a Mooney viscosity lower than that of a masticated rubber composition, which leads to high processability; and excellent productivity as a result of excluding mastication. Further, the rubber composition, when used as a material of a tire, increases the fuel economy and wet grip performance of the tire because the rubber composition achieves low heat build-up and low rolling resistance.

Further, the present invention provides a method including modification (graft copolymerization with an organic compound that has an unsaturated bond, addition reaction with an organic compound, or epoxidation) of a natural rubber from which phosphorus compounds (for example, phospholipids), essentially contained in natural rubber, are removed as much as possible by techniques such as saponifying natural rubber latex and then washing the latex. This results in the production of a modified natural rubber that has an excellent degree of modification (for example, a modified natural rubber with a high degree of grafting in the case of graft copolymerization) and the modification of the natural rubber at high modification efficiency (for example, at high grafting efficiency in the case of graft copolymerization).

Furthermore, the present invention uses a natural rubber containing 200 ppm or less of phosphorus, and thus provides excellent processability and eliminates the need for mastication. Also, the present invention provides a rubber composition containing the natural rubber with 200 ppm or less of phosphorus contained therein and carbon black and/or a white filler, and the rubber composition can be used for a tread of a tire (hereinafter such a rubber composition is also referred to as the rubber composition for a tire tread according to the present invention). This makes it possible to achieve both high fuel economy (low rolling resistance) and high abrasion resistance. Moreover, the above rubber composition can be used as a rubber composition for covering a carcass cord (hereinafter also referred to as the rubber composition for covering a carcass cord according to the present invention). In this case, it is possible to achieve improved adhesion of the rubber composition to the carcass cord as well as both high fuel economy (low rolling resistance) and high rubber strength.

BEST MODE FOR CARRYING OUT THE INVENTION (Natural Rubber)

The natural rubber of the present invention contains 200 ppm or less of phosphorus.

The natural rubber of the present invention contains 200 ppm or less of phosphorus, and preferably contains 150 ppm or less, and more preferably 100 ppm or less of phosphorus. A phosphorus content of more than 200 ppm tends to increase the gel content during storage and increase the tan $\delta$ of vulcanized rubber composition. Here, the phosphorus content can be measured by a conventional method such as ICP emission spectrometry. The phosphorus is derived from phospholipids (phosphorus compounds).

The natural rubber of the present invention preferably contains 20% by mass or less, and more preferably 10% by mass or less of gel. A gel content of more than 20% by mass tends to result in reduced processability such as increased Mooney viscosity. The gel content refers to the amount determined as a matter insoluble in toluene that is a non-polar solvent. Hereinafter, such a content is referred to simply as "gel content" or "gel fraction". The gel content is determined by the following determination method. First, a natural rubber sample is immersed in dehydrated toluene and is allowed to stand for one week in a dark place protected from light. Next, the toluene solution is centrifuged for 30 minutes at $1.3\times10^5$ rpm so that a toluene-insoluble gel fraction and a toluene-soluble fraction are separated from each other. The toluene-insoluble gel fraction is added with methanol to be solidified, and is then dried. Finally, the gel content can be determined from the ratio of the mass of the dried gel fraction and the original mass of the sample.

The natural rubber of the present invention preferably contains substantially no phospholipids. Here, natural rubber "substantially containing no phospholipids" means that the natural rubber shows no peak corresponding to phospholipids between −3 ppm and 1 ppm in a $^{31}$P-NMR spectrum of an extract produced by chloroform extraction from the natural rubber sample. The peak corresponding to phosphorus between −3 ppm and 1 ppm refers to the peak corresponding to the structure of phosphate ester in the phosphorus component in phospholipids.

The natural rubber of the present invention preferably contains 0.3% by mass or less, and more preferably 0.15% by mass or less of nitrogen. A nitrogen content of more than 0.3% by mass tends to increase Mooney viscosity during storage. The nitrogen is derived from protein. The nitrogen content can be determined by a conventional method such as the Kjeldahl method.

Examples of the method for producing the natural rubber of the present invention include a method for producing a natural rubber by saponifying natural rubber latex with an alkali, washing a rubber coagulated therefrom after the saponification, and then drying the rubber. The saponification is performed by adding an alkali and optionally a surfactant to natural rubber latex and allowing the mixture to stand for a certain period at a predetermined temperature. Here, the mixture may optionally be stirred or subjected to other operations. The method of the present invention removes phosphorus compounds, which are separated in the saponification, by washing, and thereby can reduce the phosphorus content in natural rubber. Further, the saponification degrades protein in natural rubber, which makes it possible to reduce the nitrogen content in natural rubber. In the present invention, the saponification is performed by adding an alkali to natural rubber latex. The addition to natural rubber latex leads to efficient saponification.

Natural rubber latex is sap extracted from hevea trees and contains components such as water, protein, lipids, and inorganic salts as well as a rubber component. A gel in rubber is thought to be derived from those various impurities contained in rubber. The latex used in the present invention can be raw latex taken from hevea trees by tapping the trees, or purified latex concentrated by centrifugation. Alternatively, high ammonia latex may be used which is produced by adding ammonia to raw rubber latex through a common method so as to inhibit the corruption of raw rubber latex owing to bacteria existing in the latex and to prevent coagulation of the latex. In the production method of the present invention, rubber latex used for producing raw rubber requires to be latex within 15 days after extraction as described above, and is preferably latex within 10 days after extraction.

Examples of the alkali used in the saponification include sodium hydroxide, potassium hydroxide, calcium hydroxide, and amine compounds. Among these, sodium hydroxide and potassium hydroxide are particularly preferable in terms of the saponification effects and the effects on stability of natural rubber latex.

The addition amount of the alkali is not particularly limited. The minimum addition amount of the alkali is preferably 0.1 parts by mass or more, and more preferably 0.3 parts by mass or more per 100 parts by mass of the solids in natural rubber latex. Further, the maximum addition amount of the alkali is preferably 12 parts by mass or less, more preferably 10 parts by mass or less, still more preferably 7 parts by mass or less, and particularly preferably 5 parts by mass or less per 100 parts by mass of the solids in natural rubber latex. An addition amount of the alkali of less than 0.1 parts by mass may require a long time for saponification. On the other hand, an addition amount of the alkali of more than 12 parts by mass may destabilize natural rubber latex.

The surfactant to be used may be at least one of anionic surfactants, nonionic surfactants, and ampholytic surfactants. Examples of the anionic surfactants include carboxylic acid anionic surfactants, sulfonic acid anionic surfactants, sulfate anionic surfactants, and phosphate anionic surfactants. Examples of the nonionic surfactants include polyoxyalkylene ether nonionic surfactants, polyoxyalkylene ester nonionic surfactants, polyhydric alcohol fatty acid ester nonionic surfactants, sugar fatty acid ester nonionic surfactants, and alkyl polyglycoside nonionic surfactants. Examples of the ampholytic surfactants include amino acid ampholytic surfactants, betaine ampholytic surfactants, and amine oxide ampholytic surfactants.

The minimum addition amount of the surfactant is preferably 0.01 parts by mass or more, and more preferably 0.1 parts by mass or more per 100 parts by mass of the solids of natural rubber latex. The maximum addition amount of the surfactant is preferably 6 parts by mass or less, more preferably 5 parts by mass or less, still more preferably 3.5 parts by mass or less, and particularly preferably 3 parts by mass or less per 100 parts by mass of the solids of natural rubber latex. An addition amount of the surfactant of less than 0.01 parts by mass may destabilize natural rubber latex during the saponification. On the other hand, an addition amount of the surfactant of more than 6 parts by mass may excessively stabilize natural rubber latex, which may make it difficult for the natural rubber latex to coagulate.

The temperature during the saponification can be appropriately set within a range that allows the saponification with an alkali to proceed at a sufficient reaction rate, and within a range that does not cause natural rubber latex to be subjected to denaturation such as coagulation. Generally, the temperature during the saponification is preferably 20° to 70° C., and more preferably 30° to 70° C. Further, the period of the saponification in the case of allowing natural rubber latex to stand statically is preferably 3 to 48 hours, and more preferably 3 to 24 hours in terms of sufficient level of saponification and improvement of productivity. The length of the period depends on the temperature during the saponification.

After the saponification, the coagulated rubber is broken up and then washed. Examples of the coagulation method include a method of adding an acid such as formic acid to latex so as to adjust the pH of the latex. Further, examples of the washing method include a method of diluting the coagulated rubber with water for washing, and centrifuging the mixture to extract the rubber. Before the centrifugation, the dilution with water is first performed so that the content of the rubber formed from natural rubber latex is 5 to 40% by mass, and more preferably 10 to 30% by mass. Next, the diluted rubber mixture may be centrifuged for 1 to 60 minutes at 5000 to 10000 rpm. After the completion of washing, a saponification-treated natural rubber latex can be produced. Then, drying the saponification-treated natural rubber latex provides the natural rubber of the present invention.

In the production method according to the present invention, the saponification, washing, and drying is completed within 15 days after natural rubber latex is extracted. Further, it is preferable to complete the saponification, washing, and drying within 10 days (more preferably within 5 days) after the latex is extracted. This is because the gel content increases if the latex is left to stand for more than 15 days without being solidified after extraction.

(Rubber Composition)

The rubber composition of the present invention contains a vulcanizing agent as well as the above natural rubber. Examples of the vulcanizing agent include sulfur, organic peroxides, and thiurams.

The blending amount of the vulcanizing agent is preferably 0.1 to 5 parts by mass per 100 parts by mass of the rubber component. The minimum blending amount of the vulcanizing agent is more preferably 0.5 parts by mass and the maximum blending amount is more preferably 3 parts by mass. A blending amount of the vulcanizing agent of less than 0.1 parts by mass may not result in a sufficient degree of crosslinking. On the other hand, a blending amount of the vulcanizing agent of more than 5 parts by mass may result in an excessively high degree of crosslinking, which may deteriorate physical properties of the vulcanized rubber composition.

The rubber composition of the present invention may contain various compounding ingredients and additives that can be blended in rubber compositions for a tire or other rubber compositions that are generally used, in addition to the vulcanizing agent. Examples of the compounding ingredients and additives include reinforcing agents such as silica and carbon black; vulcanization accelerators; various oils; age resistors; softeners; and plasticizers. The compounding ingredients and additives may be contained in a commonly used amount.

(Pneumatic Tire)

The present invention relates to a pneumatic tire made with the above rubber composition. The pneumatic tire is made with the rubber composition of the present invention in accordance with a common method. Specifically, the rubber composition of the present invention with the above various chemical agents optionally blended therein is, before vulcanization, extruded and processed into the shape of a component of a tire, and molded in a usual manner on a tire building machine to obtain an unvulcanized tire. The unvulcanized tire is then subjected to heating and pressing in a vulcanizer, and thereby a tire can be produced. The pneumatic tire of the present invention thus produced can achieve both sufficient performance on ice and handling stability on dry roads.

(Modified Natural Rubber)

The modified natural rubber of the present invention is produced by modifying a natural rubber that contains 200 ppm or less of phosphorus (natural rubber of the present invention). Although the natural rubber is described herein to contain 200 ppm or less of phosphorus, the natural rubber preferably contains 100 ppm or less of phosphorus. A phosphorus content of more than 200 ppm tends to decrease the degree of modification and modification efficiency (for example, grafting efficiency in the case of graft copolymerization) in the production of modified natural rubber from natural rubber.

The natural rubber of the present invention can be produced, for example, by saponifying natural rubber latex with an alkali and washing a coagulated rubber formed therefrom, as described above. Highly efficient modification seems to be enabled by saponifying freshly-extracted natural rubber latex, and sufficiently washing the saponified latex with water to remove phospholipids that are a non-rubber component on the surface of natural rubber latex particles.

The modification of a natural rubber containing 200 ppm or less of phosphorus (natural rubber of the present invention) can be achieved by, for example, applying a method similar to a known modification method of natural rubber latex to the above saponification-treated natural rubber latex.

Among the modified natural rubbers of the present invention, a modified natural rubber formed through the graft copolymerization with an organic compound having an unsaturated bond can be produced by adding an organic compound, which has an unsaturated bond, to the saponification-treated natural rubber latex and then adding an appropriate polymerization initiator to cause a reaction. The organic compound having an unsaturated bond can be exemplified by graft-copolymerizable monomers, including methacrylic acids and acrylic acids or derivatives thereof such as methacrylic acid, acrylic acid, methyl methacrylate, methyl acrylate, and 2-hydroxyethyl methacrylate; acrylonitrile; vinyl acetate; styrene; acrylamide; and vinylpyrrolidone. When an organic compound having an unsaturated bond is added to the latex, an emulsifier may be previously added to the latex, or the organic compound having an unsaturated bond may be emulsified before being added to the latex. Preferable examples of the emulsifier include, but are not particularly limited to, nonionic surfactants.

Generally, the minimum addition amount of the organic compound having an unsaturated bond is preferably 5 parts by mass or more, and more preferably 10 parts by mass or more per 100 parts by mass of the natural rubber. Also, the maximum addition amount thereof is preferably 100 parts by mass or less, and more preferably 80 parts by mass or less per 100 parts by mass of the natural rubber. An addition amount of the organic compound having an unsaturated bond of less than 5 parts by mass may result in a decreased degree of grafting with the organic compound having an unsaturated bond, which may decrease the degree of modification of natural rubber. On the other hand, an addition amount of the organic compound having an unsaturated bond of more than 100 parts by mass may increase generation of homopolymers, which may decrease the grafting efficiency.

Examples of the polymerization initiator include peroxides such as benzoyl peroxide, hydrogen peroxide, cumene hydroperoxide, tert-butyl hydroperoxide, di-tert-butyl peroxide, 2,2-azobisisobutyronitrile, and potassium persulfate. Redox polymerization initiators are particularly preferable in order to decrease the polymerization temperature. Examples of the reducing agent combined with a peroxide to make the redox polymerization initiator include tetraethylenepentamine, mercaptans, sodium hydrogen sulfite, reducing metal ions, and ascorbic acid. Examples of preferable combinations for the redox polymerization initiators include a combination of tert-butyl hydroperoxide and tetraethylenepentamine, a combination of hydrogen peroxide and $Fe^{2+}$ salt, and a combination of $K_2SO_2O_8$ and $NaHSO_3$. Each of the polymerization initiators may be used alone, or two or more of these may be used in combination.

The minimum addition amount of the polymerization initiator is preferably 0.3 moles or more, and more preferably 0.5 moles or more per 100 moles of the organic compound that has an unsaturated bond. The maximum addition amount of the polymerization initiator is preferably 10 moles or less, and more preferably 1 mole or less per 100 moles of the organic compound that has an unsaturated bond. The above ingredients may be reacted in a reaction vessel for 2 to 10 hours at 30° to 80° C. so as to produce a graft-copolymerized polymer. Here, the natural rubber to be used, containing 200 ppm or less of phosphorus, may be in a latex state or may be a rubber solution or solid rubber.

The graft-copolymerized polymer (modified natural rubber) produced as described above has a high degree of grafting (a ratio of the mass of graft-polymerized monomers to the mass of the main chain polymer) and a high grafting efficiency (a ratio of the mass of graft-polymerized monomers to the total mass of polymerized monomers). Hence, the graft-copolymerized polymer has excellent properties such as adhesion while keeping the strength, and can be suitably used for products such as an adhesive.

The addition-reaction between an organic compound and the natural rubber containing 200 ppm or less of phosphorus according to the present invention may be performed by, for example, adding an organic compound such as a thiol compound to the saponification-treated natural rubber latex so as to produce a natural rubber added with the organic compound. Examples of the thiol compound include ethyl mercaptan, 1-propanethiol, n-butyl mercaptan, 1-hexanethiol, 1-dodecanethiol, 1-octanethiol, benzenethiol, 1,2-ethanedithiol, 1,3-propanedithiol, 1,4-butanethiol, 1,2-benzenethiol, 1,4-benzenethiol, 2-aminoethanethiol, 2-aminobenzenethiol, 4-aminobenzenethiol, mercaptoacetic acid, and o-mercaptobenzoic acid.

When the thiol compound is added to the latex, an emulsifier may be previously added to the latex, or the thiol compound may be emulsified with an emulsifier before being added to the latex. Further, an organic peroxide can be added according to need. Preferable examples of the emulsifier include, but are not particularly limited to, nonionic surfactants.

Generally, the minimum addition amount of the thiol compound is preferably 0.1 parts by mass or more, and more preferably 0.5 parts by mass or more per 100 parts by mass of the natural rubber. Further, the maximum addition amount thereof is preferably 20 parts by mass or less, and more preferably 10 parts by mass or less per 100 parts by mass of the natural rubber. An addition amount of the thiol compound of less than 0.1 parts by mass tends to result in an insufficient degree of addition of thiol compounds. On the other hand, an addition amount of the thiol compound of more than 20 parts by mass may deteriorate the processability of the rubber.

The addition reaction is preferably proceeded with stirring. For example, the latex and the above ingredients including a thiol compound may be added to a reaction vessel and then irradiated with 500 to 1000 W of microwaves for 10 minutes to 1 hour. This provides a modified natural rubber containing saponified natural rubber molecules that are added with the thiol compound.

Alternatively, for example, the latex and the above ingredients including a thiol compound may be added to a reaction vessel and reacted for 10 minutes to 24 hours at 30° to 80° C. This also provides a modified natural rubber containing saponified natural rubber molecules that are added with the thiol compound.

Here, the natural rubber to be used, containing 200 ppm or less of phosphorus, may be in a latex state or may be a rubber solution or solid rubber, as in the above grafting. The saponified natural rubber added with an organic compound produced thereby has a high degree of addition reaction ([mass of added organic compounds]/[mass of main chain polymer]), and thus demonstrates high reinforcement. Accordingly, the saponified natural rubber added with an organic compound can be suitably used for products such as a tire tread.

The epoxidation of the natural rubber containing 200 ppm or less of phosphorus according to the present invention may be performed by, for example, adding an organic peroxyacid to the saponification-treated natural rubber latex and epoxidizing the natural rubber. Examples of the organic peroxyacid include perbenzoic acid, peracetic acid, performic acid, perphthalic acid, perpropionic acid, trifluoroperacetic acid, and perbutyric acid. These organic peroxyacids may be directly added to the latex. However, it is preferable to add to the latex two species that are together to generate an organic peroxyacid, and then react the natural rubber in the latex with the organic peroxyacid generated. For example, formic acid and hydrogen peroxide may be sequentially added in the case of generating performic acid. Also, in the case of generating peracetic acid, glacial acetic acid and hydrogen peroxide may be sequentially added and reacted.

Generally, the minimum addition amount of the organic peroxyacid is preferably 5 parts by mass or more, and more preferably 10 parts by mass or more per 100 parts by mass of the natural rubber. Further, the maximum addition amount thereof is preferably 70 parts by mass or less, and more preferably 60 parts by mass or less per 100 parts by mass of the natural rubber. In the case of adding two species that are together to generate an organic peroxyacid, the addition amount of these species is also adjusted so that the amount of an organic peroxyacid to be generated therefrom will be within the above range. An addition amount of the organic peroxyacid of less than 5 parts by mass may result in an insufficient degree of modification. On the other hand, an addition amount of the organic peroxyacid of more than 70 parts by mass may greatly deteriorate the physical properties of the rubber due to a secondary reaction or other problems.

Before being added with the above organic peroxyacid or with the species that are together to generate an organic peroxyacid, the latex is preferably added with an emulsifier such as a nonionic emulsifier and stabilized to maintain a near-neutral pH of about 5 to 7. The epoxidation is generally performed by causing a reaction for 3 to 10 hours at 20° to 60° C.

Here, the natural rubber to be used, which contains 200 ppm or less of phosphorus, may be in a latex state or may be a rubber solution or solid rubber, as in the above grafting. The epoxidized natural rubber produced thereby has a high degree of epoxidation (the degree of change of unsaturated bonds into epoxy groups), and thus has excellent properties such as oil resistance and gas permeation resistance while keeping the strength. Accordingly, the epoxidized natural rubber can be suitably used for products such as a hose and an inner liner of a tire.

The modified natural rubber produced according to the present invention may optionally be added with other ingredients to produce a rubber composition which is applicable to rubber industrial products such as a tire. The other ingredients include other rubbers such as diene rubber; fillers such as carbon black and silica; and additives such as silane coupling agents, zinc oxide, stearic acid, vulcanizing agents, auxiliary vulcanizing agents, vulcanization accelerators, and age resistors.

(Rubber Composition for Tire Tread and Rubber Composition for Covering Carcass Cord)

Each of the rubber composition for a tire tread and the rubber composition for covering a carcass cord according to the present invention contains a rubber component with 5% by mass or more of a natural rubber that contains 200 ppm or less of phosphorus, and carbon black and/or a white filler.

The natural rubber of the present invention (hereinafter also referred to as "saponified natural rubber") contains 200 ppm or less of phosphorus. The natural rubber preferably contains 150 ppm or less of phosphorus. A phosphorus content of more than 200 ppm tends to increase Mooney viscosity during storage so as to decrease processability, and to fail to achieve excellent fuel economy.

The natural rubber of the present invention preferably contains 0.3% by mass or less, and more preferably 0.15% by mass or less of nitrogen. A nitrogen content of more than 0.3% by mass tends to increase Mooney viscosity during storage so as to decrease processability, and to fail to achieve excellent fuel economy.

In the rubber composition for a tire tread according to the present invention, the above natural rubber is contained in an amount of 5% by mass or more, preferably 10% by mass or more, and more preferably 20% by mass or more in 100% by mass of the rubber component. A content of the natural rubber of less than 5% by mass may not result in excellent fuel economy. Also, the above natural rubber is preferably contained in an amount of 50% by mass or less, and more preferably 40% by mass or less in 100% by mass of the rubber component. A content of the natural rubber of more than 50% by mass may not result in sufficient grip performance.

In the rubber composition for covering a carcass cord according to the present invention, the above natural rubber is contained in an amount of 5% by mass or more, preferably 60% by mass or more, more preferably 65% by mass or more, and still more preferably 70% by mass or more in 100% by mass of the rubber component. A content of the natural rubber of less than 5% by mass may not result in excellent fuel economy. The above natural rubber may be contained in an amount of 100% by mass and is preferably contained in an amount of 80% by mass or less, and more preferably 70% by mass or less in 100% by mass of the rubber component.

Examples of the rubbers in the rubber component used according to the present invention, other than the above natural rubber, include diene rubbers generally used for a rubber composition for a tire. Specific examples of the diene rubber include, but are not limited to, natural rubber (NR) other than the above natural rubber (saponified natural rubber), styrene butadiene rubber (SBR), butadiene rubber (BR), isoprene rubber (IR), ethylene propylene diene rubber (EPDM), chloroprene rubber (CR), acrylonitrile butadiene rubber (NBR), butyl rubber (IIR), styrene isoprene butadiene rubber (SIBR), and epoxidized natural rubber. Each of these rubbers may be used alone, or two or more of these may be used in combination. Among these, SBR is preferable for a rubber composition for a tire tread because SBR contributes to achievement of sufficient tire strength and excellent abrasion resistance. Also, SBR is preferable for a rubber composition for covering a carcass cord because SBR contributes to achievement of sufficient adhesion of the rubber composition to the carcass cord and contributes to achievement of excellent heat resistance. Examples of SBR include, but are not particularly limited to, SBR produced through a solution polymerization process, and SBR produced through an emulsion polymerization process.

If each of the rubber composition for a tire tread and the rubber composition for covering a carcass cord according to the present invention is to contain SBR, the styrene content in the SBR is preferably 5% by mass or more, and more preferably 10% by mass or more. A styrene content of less than 5% by mass may not lead to sufficient grip performance and rubber strength. Also, the styrene content in the SBR is preferably 50% by mass or less, and more preferably 45% by mass or less. A styrene content of more than 50% by mass may not lead to excellent fuel economy.

The styrene content in SBR herein is determined by $^1$H-NMR spectrometry.

If each of the rubber composition for a tire tread and the rubber composition for covering a carcass cord according to the present invention is to contain SBR, the vinyl content in the SBR is preferably 10% by mass or more, and more preferably 15% by mass or more. A vinyl content of less than 10% by mass may not lead to sufficient grip performance and rubber strength. Also, the vinyl content in the SBR is preferably 65% by mass or less, and more preferably 60% by mass or less. A vinyl content of more than 65% by mass may not lead to excellent fuel economy.

The vinyl content in SBR herein refers to the content of vinyl of butadiene moiety, and is determined by $^1$H-NMR spectrometry.

If the rubber composition for a tire tread according to the present invention is to contain SBR, the SBR is preferably contained in an amount of 40% by mass or more, and more preferably 50% by mass or more in 100% by mass of the rubber component. An SBR content of less than 40% by mass may not result in sufficient grip performance. Also, the SBR is preferably contained in an amount of 90% by mass or less, and more preferably 80% by mass or less in 100% by mass of the rubber component. An SBR content of more than 90% by mass may not result in excellent fuel economy that should be achieved by the above natural rubber.

If the rubber composition for covering a carcass cord according to the present invention is to contain SBR, the SBR is preferably contained in an amount of 10% by mass or more, and more preferably 20% by mass or more in 100% by mass of the rubber component. An SBR content of less than 10% by mass may not result in sufficient adhesion and rubber strength. Also, the SBR is preferably contained in an amount of 50% by mass or less, and more preferably 40% by mass or less in 100% by mass of the rubber component. An SBR content of more than 50% by mass may not lead to excellently-low heat build-up, sufficient adhesion, and sufficient rubber strength.

Examples of the carbon black include FEF, GPF, HAF, ISAF, SAF, and S-SAF. The application of the above natural rubber and carbon black to a tread can increase rubber strength and thus achieve excellent abrasion resistance. Further, the application of the above natural rubber and carbon black to a rubber composition for covering a carcass cord can achieve high adhesion and rubber strength.

The nitrogen adsorption specific surface area ($N_2SA$) of the carbon black used for the rubber composition for a tire tread and the rubber composition for covering a carcass cord is preferably 20 m$^2$/g or larger, and more preferably 30 m$^2$/g or larger. An $N_2SA$ of smaller than 20 m$^2$/g may not result in sufficient abrasion resistance, adhesion, and rubber strength. Also, the $N_2SA$ of the carbon black is preferably 150 m$^2$/g or smaller, and more preferably 120 m$^2$/g or smaller. An $N_2SA$ of larger than 150 m$^2$/g tends to decrease processability and to deteriorate the low heat build-up property.

The nitrogen adsorption specific surface area of carbon black herein can be determined in accordance with the method A described in JIS K6217.

The dibutyl phthalate oil absorption (DBP oil absorption) of the carbon black used for the rubber composition for a tire tread and the rubber composition for covering a carcass cord is preferably 60 ml/100 g or more, and more preferably 80 ml/100 g or more. A DBP oil absorption of less than 60 ml/100 g tends not to result in favorable handling stability. Also, the DBP oil absorption of the carbon black is preferably 140 ml/100 g or less, and more preferably 120 ml/100 g or less. A DBP oil absorption of more than 140 ml/100 g may decrease processability.

The DBP oil absorption of carbon black herein can be determined in accordance with the measuring method described in JIS K6217-4.

Each of the rubber composition for a tire tread and the rubber composition for covering a carcass cord according to the present invention preferably contains 5 parts by mass or more, and more preferably 10 parts by mass or more of carbon black per 100 parts by mass of the rubber component. A carbon black content of less than 5 parts by mass may not result in sufficient abrasion resistance, adhesion, and rubber strength. The rubber compositions each preferably contain 80 parts by mass or less, and more preferably 60 parts by mass or less of carbon black per 100 parts by mass of the rubber component. A carbon black content of more than 80 parts by mass tends to decrease processability and mechanical strength.

The white filler may be a filler generally used in the rubber industries, including silica; calcium carbonate; mica such as sericite; aluminum hydroxide; magnesium oxide; magnesium hydroxide; clay; talc; alumina; or titanium oxide. Among these, silica is preferable in that the silica can achieve both sufficient abrasion resistance and fuel economy when used for a tread, and that the silica can achieve excellent adhesion, fuel economy, and rubber strength when used for a rubber composition for covering a carcass cord. Examples of the silica include, but are not particularly limited to, silica produced through a dry process (anhydrous silicic acid) and/or silica produced through a wet process (hydrous silicic acid), and the like. Among these, silica produced through a wet process (hydrous silicic acid) is preferable in that such silica contains a large number of silanol groups.

The nitrogen adsorption specific surface area of the silica according to the BET method is preferably 30 $m^2/g$ or larger, and more preferably 100 $m^2/g$ or larger. A nitrogen adsorption specific surface area of the silica of smaller than 30 $m^2/g$ tends to decrease the breaking strength of the rubber composition after vulcanization. Also, the nitrogen adsorption specific surface area of the silica according to the BET method is preferably 500 $m^2/g$ or smaller, and more preferably 300 $m^2/g$ or smaller. A nitrogen adsorption specific surface area of the silica of larger than 500 $m^2/g$ tends to decrease processability. Here, the nitrogen adsorption specific surface area of silica according to the BET method can be determined by a method in accordance with ASTM-D-4820-93.

Each of the above rubber compositions preferably contains 5 parts by mass or more, and more preferably 10 parts by mass or more of silica per 100 parts by mass of the rubber component. A silica content of less than 5 parts by mass may not result in sufficient fuel economy. Also, the rubber compositions each preferably contain 100 parts by mass or less, and more preferably 80 parts by mass or less of silica per 100 parts by mass of the rubber component. A silica content of more than 100 parts by mass tends to decrease processability.

Each of the rubber compositions according to the present invention preferably contains a silane coupling agent as well as the silica. The silane coupling agent is not particularly restricted, and any silane coupling agent conventionally used with silica in the tire industries can be used. Examples thereof include sulfide-type silane coupling agents such as bis(3-triethoxysilylpropyl)tetrasulfide, bis(2-triethoxysilylethyl) tetrasulfide, bis(3-trimethoxysilylpropyl)tetrasulfide, bis(2-trimethoxysilylethyl)tetrasulfide, bis(3-triethoxysilylpropyl) trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide, and 3-trimethoxysilylpropylmethacrylate monosulfide; mercapto-type silane coupling agents such as 3-mercaptopropyltrimethoxysilane, 3-mercaptopropyltriethoxysilane, 2-mercaptoethyltrimethoxysilane, and 2-mercaptcethyltriethoxysilane; vinyl-type silane coupling agents such as vinyltriethoxysilane, and vinyltrimethoxysilane; amino-type silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-type silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-type silane coupling agents such as 3-nitropropyltrimethoxysilane, and 3-nitropropyltriethoxysilane; and chloro-type silane coupling agents such as 3-chloropropyltrimethoxysilane, 3-chloropropyltriethoxysilane, 2-chloroethyltrimethoxysilane, and 2-chloroethyltriethoxysilane. Each of these silane coupling agents may be used alone, or two or more of these may be used in combination.

If the rubber compositions each are to contain the silane coupling agent, the rubber compositions each preferably contain 2 parts by mass or more, and more preferably 4 parts by mass or more of the silane coupling agent per 100 parts by mass of the silica. An amount of the silane coupling agent of less than 2 parts by mass may deteriorate rubber strength and abrasion resistance. Also, the rubber compositions each preferably contain 15 parts by mass or less, and more preferably 13 parts by mass or less of the silane coupling agent per 100 parts by mass of the silica. An amount of the silane coupling agent of more than 15 parts by mass may not lead to an increase in the improvement of rubber strength and abrasion resistance, which should be caused by addition of a silane coupling agent, and this tends to increase the cost.

The rubber composition for a tire tread according to the present invention preferably contains 30 parts by mass or more, more preferably 35 parts by mass or more, and still more preferably 40 parts by mass or more of a combination of the carbon black and the white filler per 100 parts by mass of the rubber component. An amount of a combination of the carbon black and the white filler of less than 30 parts by mass may not lead to sufficient abrasion resistance. Also, the rubber composition for a tire tread preferably contains 150 parts by mass or less, more preferably 120 parts by mass or less, and still more preferably 100 parts by mass or less of a combination of the carbon black and the white filler per 100 parts by mass of the rubber component. An amount of a combination of the carbon black and the white filler of more than 150 parts by mass may decrease processability and may not lead to sufficiently-low heat build-up.

The rubber composition for covering a carcass cord according to the present invention preferably contains 30 parts by mass or more, and more preferably 35 parts by mass or more of a combination of the carbon black and the white filler per 100 parts by mass of the rubber component. An amount of a combination of the carbon black and the white filler of less than 30 parts by mass may not result in sufficient rubber strength. Also, the rubber composition for covering a carcass cord preferably contains 100 parts by mass or less, and more preferably 80 parts by mass or less of a combination of the carbon black and the white filler per 100 parts by mass of the rubber component. An amount of a combination of the carbon black and the white filler of more than 100 parts by mass may decrease processability and may not result in sufficiently-low heat build-up.

The rubber composition for a tire tread and the rubber composition for covering a carcass cord according to the present invention each can optionally contain compounding ingredients generally used for producing rubber compositions, in addition to the ingredients described above. Examples of the compounding ingredients include zinc oxide, stearic acid, various age resistors, oils such as aromatic oils, waxes, vulcanizing agents, and vulcanization accelerators.

The rubber composition for covering a carcass cord preferably contains zinc oxide.

The rubber composition for covering a carcass cord according to the present invention preferably contains 4 parts by mass or more, and more preferably 5 parts by mass or more of zinc oxide per 100 parts by mass of the rubber component. A zinc oxide content of less than 4 parts by mass may decrease adhesion. Also, the rubber composition for covering a carcass cord preferably contains 15 parts by mass or less, and more preferably 10 parts by mass or less of zinc oxide per 100 parts by mass of the rubber component. A zinc oxide content of more than 15 parts by mass may decrease rubber strength.

Examples of the vulcanization accelerator include N-tert-butyl-2-benzothiazolyl sulfenamide (TBBS), N-cyclohexyl-2-benzothiazolyl sulfenamide (CBS), N,N'-dicyclohexyl-2-benzothiazolyl sulfenamide (DZ), mercaptobenzothiazole (MBT), dibenzothiazolyl disulfide (MBTS), and diphenylguanidine (DPG). Each of these vulcanization accelerators may be used alone, or two or more of these may be used in combination. Among these, sulfenamide vulcanization accelerators such as TBBS and CBS are preferable which have excellent vulcanization properties, and contribute to excellently-low heat build-up and great improvement of mechanical hardness with respect to physical properties of the vulcanized rubber composition. Particularly, a combination of TBBS and DPG is preferable.

The rubber composition for a tire tread and the rubber composition for covering a carcass cord according to the present invention are produced by a common method. That is, for example, the respective ingredients described above are mixed by a Banbury mixer, a kneader, or an open roll mill, and are then vulcanized, whereby a rubber composition can be produced. When natural rubber is used, mastication is generally performed before the mixing and vulcanization. However, the rubber composition of the present invention does not need mastication owing to its excellent processability. This is because the rubber composition contains a natural rubber having a reduced gel content which is produced by a method such as saponifying natural rubber latex with an alkali aqueous solution to reduce the phosphorus content and nitrogen content in natural rubber. The mastication can be performed by mixing a rubber component, including natural rubber, and other ingredients such as a peptizer (aromatic disulfide compound, aromatic mercaptan compound, etc.) with a mixing apparatus such as a Banbury mixer.

(Pneumatic Tire)

The rubber composition for a tire tread according to the present invention is used for a tire tread. The pneumatic tire of the present invention is made with the above rubber composition for a tire tread by a common method. Specifically, an unvulcanized rubber composition with the additives optionally blended therein is extruded and processed into the shape of a tire tread, and then assembled with other tire components and molded in a usual manner on a tire building machine to obtain an unvulcanized tire. The unvulcanized tire is then subjected to heating and pressing in a vulcanizer, and thereby a tire can be produced.

The rubber composition for covering a carcass cord according to the present invention is used for a rubber composition for covering a carcass cord. The pneumatic tire of the present invention is made with the above rubber composition for covering a carcass cord by a common method. Specifically, an unvulcanized rubber composition with the additives optionally blended therein is mixed, and then arranged on a carcass cord so as to cover the cord. Next, the mixture is molded into the shape of a carcass on a tire building machine and assembled with other tire components, so that an unvulcanized tire is formed. The unvulcanized tire is then subjected to heating and pressing in a vulcanizer, and thereby a tire can be produced.

The pneumatic tire of the present invention is suitably used as a tire such as a tire for passenger vehicles, a tire for buses, or a tire for trucks.

EXAMPLES

The present invention will be more specifically described based on Examples. However, the present invention is not limited thereto.

First, chemical agents used in Examples 1 to 16 and Comparative Examples 1 to 7 are listed.
Natural rubber latex: field latex obtained from Thaitex
Surfactant: Emal-E produced by Kao Corporation
NaOH: NaOH produced by Wako Pure Chemical Industries, Ltd.
Carbon black: N110 (nitrogen adsorption specific surface area ($N_2SA$): 143 $m^2/g$, DBP oil absorption: 113 ml/100 g) produced by Showa Cabot K.K.
Age resistor: NOCRAC 6C(N-(1,3-dimethylbuthyl)-N'-phenyl-p-phenylenediamine) produced by Ouchi Shinko Chemical Industrial Co., Ltd.
Stearic acid: stearic acid produced by NOF Corporation Zinc oxide: Zinc oxide #1 produced by Mitsui Mining & Smelting Co., Ltd.
Sulfur: sulfur powder produced by Tsurumi Chemical Industry Co., Ltd.
Vulcanization accelerator TBBS: NOCCELER NS(N-t-butyl-2-benzothiazyl sulfenamide) produced by Ouchi Shinko Chemical Industrial Co., Ltd.

Examples 1 to 8 and Comparative Examples 1 to 3

The procedures for preparing the respective samples are described below. In Comparative Example 1, the saponification was not be performed. In Comparative Example 2, the washing was not be performed. In Comparative Example 3, a natural rubber latex that had been stored for 20 days was used.
(1) Saponification Each natural rubber latex was stored for a different number of days, and the solid content (DRC) thereof was adjusted to 30% (w/v). Next, 1000 g of the natural rubber latex was added with 10 g of Emal-E and 10 g or 20 g of NaOH, and was then saponified for 3 to 24 hours at 70° C., whereby a saponified latex was produced.
(2) Washing The latex produced in the above process (1) was added with water to be diluted to a DRC of 15% (w/v). The diluted latex was then added with formic acid while being slowly stirred so that the pH was adjusted to 4.0 to 4.5. The latex was coagulated, and the coagulated rubber was broken up and then repeatedly washed with 1000 ml of water. Then, the rubber was dried for 120 minutes at 110° C., so that a solid rubber was produced.

The samples in Examples 1 to 8, the samples in Comparative Examples 1 to 3, and TSR rubber were subjected to determination of their properties such as the phosphorus content and the gel content according to the following methods.

—Determination of Phosphorus Content

The phosphorus content of the raw rubbers was determined with ICP emission spectrometer (ICPS-8100, produced by Shimadzu Corporation).

—$^{31}$P-NMR Determination of Phosphorus

Components extracted from the raw rubbers with chloroform were purified and then dissolved in $CDCl_3$ to prepare a test sample. The test sample was analyzed with an NMR spectrometer (400 MHz, AV400M, produced by Bruker Japan Co., Ltd) based on the standard (0 ppm) that is the determined peak corresponding to the P atom of an 80% phosphoric acid aqueous solution.

—Determination of Gel Content

Each of raw rubber samples cut with a size of 1 mm×1 mm was weighed out (70.00 mg), added with 35 mL of toluene, and allowed to stand for one week in a cool and dark place. Next, the mixture was centrifuged such that a toluene-insoluble gel fraction was precipitated and a toluene-soluble supernatant was removed. Then, the gel fraction alone was solidified with methanol and dried. The mass of the dried gel fraction was measured, and then used in the following formula to determine the gel content (%).

Gel content(% by mass)=[Mass of dried gel fraction (mg)/Mass of original sample(mg)]×100

—Determination of Nitrogen Content

The nitrogen content was determined with CHN CORDER MT-5 (produced by Yanaco Analytical Instruments Corp.) in accordance with the Kjeldahl method. In determination, first, a calibration curve for determining the nitrogen content was prepared with antipyrin taken as a reference material. Then, about 10 mg of the natural rubber produced in each of Examples and Comparative Examples was weighed out and subjected to the determination. From three determination results, was calculated the average value, which was regarded as the nitrogen content of the sample.

—Determination of Mooney Viscosity

The initial Mooney viscosity of the sample was determined at 100° C. in accordance with the determination method of Mooney viscosity specified in JIS K6300, and the Mooney viscosity of the sample was again determined six months later in the same manner.

TABLE 1

| | Example 1 | Example 2 | Example 3 | Example 4 | Example 5 | Example 6 | Example 7 |
|---|---|---|---|---|---|---|---|
| Storage period | 1 day | 1 day | 1 day | 1 day | 1 day | 5 days | 5 days |
| Saponification | Saponified | Saponified | Saponified | Saponified | Saponified | Saponified | Saponified |
| NaOH concentration (%) | 2 | 2 | 2 | 1 | 1 | 2 | 1 |
| Temperature (° C.) | 70° C. | 70° C. | 70° C. | 70° C. | 70° C. | 70° C. | 70° C. |
| Treatment time | 3 hours | 24 hours | 48 hours | 12 hours | 24 hours | 3 hours | 3 hours |
| Washing | Washed | Washed | Washed | Washed | Washed | Washed | Washed |
| Phosphorus content (ppm) | 113 | 114 | 116 | 134 | 126 | 122 | 115 |
| $^{31}$P NMR peak (−3 ppm~1 ppm) | Not detected | Not detected | Not detected | Not detected | Not detected | Not detected | Not detected |
| Gel content (% by mass) | 6.3 | 6.8 | 5.5 | 8.7 | 8.5 | 7.6 | 12.1 |
| Nitrogen content (% by mass) | 0.19 | 0.13 | 0.11 | 0.21 | 0.14 | 0.13 | 0.22 |
| Initial mooney viscosity | 59 | 58 | 58 | 62 | 59 | 61 | 62 |
| Mooney viscosity 6 months later | 63 | 64 | 62 | 65 | 63 | 64 | 66 |

| | Example 8 | Comparative Example 1 | Comparative Example 2 | Comparative Example 3 | TSR |
|---|---|---|---|---|---|
| Storage period | 8 days | 1 day | 1 day | 20 days | N/A |
| Saponification | Saponified | Not saponified | Saponified | Saponified | N/A |
| NaOH concentration (%) | 2 | N/A | 2 | 2 | N/A |
| Temperature (° C.) | 70° C. | N/A | 70° C. | 70° C. | N/A |
| Treatment time | 3 hours | N/A | 3 hours | 3 hours | N/A |
| Washing | Washed | Washed | Not washed | Washed | N/A |
| Phosphorus content (ppm) | 133 | 430 | 298 | 213 | 572 |
| $^{31}$P NMR peak (−3 ppm~1 ppm) | Not detected | Detected | Detected | Not detected | Detected |
| Gel content (% by mass) | 9.6 | 23.1 | 18.3 | 24.3 | 26.9 |
| Nitrogen content (% by mass) | 0.16 | 0.36 | 0.43 | 0.21 | 0.33 |
| Initial mooney viscosity | 63 | 81 | 80 | 77 | 83 |
| Mooney viscosity 6 months later | 67 | 89 | 92 | 88 | 93 |

Table 1 shows that the samples in Examples 1 to 8 contained 200 ppm or less of phosphorus. Also, these samples were found to have a low Mooney viscosity, and still have a low Mooney viscosity after six months. On the other hand, the samples in Comparative Examples 1 to 3 were found to have a high Mooney viscosity and have an increased Mooney viscosity after six months.

Examples 9 to 16 and Comparative Examples 4 to 7

Here, 100 parts by mass of each of TSR rubber and the natural rubbers produced in Examples 1 to 8 and Comparative Examples 1 to 3 was mixed with the following ingredients to provide each test rubber composition. The ingredients were 50 parts by mass of carbon black, 3 parts by mass of stearic acid, 3 parts by mass of zinc oxide, 1 part by mass of age resistor NOCRAC 6C, 1.5 parts by mass of sulfur, and 0.8 parts by mass of vulcanization accelerator NOCCELER NS. Then, each test rubber composition was press-vulcanized for 20 minutes at 170° C., and thereby a vulcanized rubber composition was produced. The produced vulcanized rubber compositions each were then subjected to tests of the respective properties shown in Table 2.

<Tensile Stress (M300)>

The tensile stress at 300% elongation (M300) was determined for each rubber composition in accordance with JIS K6251-1993.

<Tensile Test>

A No. 3 dumbbell-shaped sample from each of the vulcanized rubber compositions was subjected to tensile tests in accordance with JIS K6251, so that the tensile strength at break, TB (MPa), and the elongation at break, EB (%), of each sample were determined.

<Rubber Hardness>

The hardness (Hs) of each vulcanized rubber composition was determined at room temperature with a JIS-A hardness meter.

<Rolling Resistance Index>

The loss tangent (tan δ) of each sample was determined with a viscoelasticity spectrometer VES (produced by Iwamoto Seisakusho Co., Ltd.) under the following conditions: a temperature of 70° C.; an initial strain of 10%; and a dynamic strain of 2%.

Surfactant: Emal-E produced by Kao Corporation
NaOH: NaOH produced by Wako Pure Chemical Industries, Ltd. Nonionic emulsifier: EMULGEN106, EMULGEN430 produced by Kao Corporation Preparation 1
(Saponification)

The solid content (DRC) of a field latex obtained from a plantation was adjusted to 30% (w/v). Next, 1000 g of the natural rubber latex was added with 10 g of Emal-E and 10 g of NaOH and then saponified for 24 hours at 70° C. The resultant latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Thereby, a saponification-treated natural rubber latex was produced.

Preparation 2
(Saponification)

The solid content (DRC) of a field latex obtained from a plantation was adjusted to 30% (w/v). Next, 1000 g of the natural rubber latex was added with 10 g of Emal-E and 20 g of NaOH and then saponified for 48 hours at 70° C. The resultant latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Thereby, a saponification-treated natural rubber latex was produced.

Preparation 3
(Saponification)

The solid content (DRC) of a field latex obtained from a plantation was adjusted to 30% (w/v). Next, 1000 g of the natural rubber latex was added with 10 g of Emal-E and 10 g

TABLE 2

|  | Example 9 | Example 10 | Example 11 | Example 12 | Example 13 | Example 14 | Example 15 |
|---|---|---|---|---|---|---|---|
| Rubber used | Example 1 | Example 2 | Example 3 | Example 4 | Example 5 | Example 6 | Example 7 |
| Mooney viscosity | 59 | 61 | 62 | 63 | 62 | 62 | 63 |
| TB (MPa) | 28.5 | 28.7 | 29.0 | 28.8 | 27.9 | 28.5 | 28.4 |
| M300 (MPa) | 18.3 | 18.4 | 19.1 | 18.3 | 18.2 | 18.4 | 18.7 |
| EB (%) | 460 | 470 | 450 | 450 | 480 | 450 | 440 |
| Hs | 59 | 58 | 59 | 60 | 59 | 59 | 59 |
| tan δ (70° C.) | 0.146 | 0.143 | 0.139 | 0.147 | 0.144 | 0.141 | 0.147 |

|  | Example 16 | Comparative Example 4 | Comparative Example 5 | Comparative Example 6 | Comparative Example 7 |
|---|---|---|---|---|---|
| Rubber used | Example 8 | Comparative Example 1 | Comparative Example 2 | Comparative Example 3 | TSR |
| Mooney viscosity | 62 | 64 | 63 | 63 | 63 |
| TB (MPa) | 28.7 | 28.9 | 28.7 | 28.4 | 28.3 |
| M300 (MPa) | 18.5 | 19.2 | 18.8 | 18.7 | 18.5 |
| EB (%) | 460 | 430 | 430 | 440 | 440 |
| Hs | 60 | 59 | 58 | 60 | 60 |
| tan δ (70° C.) | 0.148 | 0.162 | 0.153 | 0.157 | 0.157 |

Table 2 shows that the vulcanized rubber compositions in Examples 9 to 16 had a lower Mooney viscosity and better processability than those of the vulcanized rubber compositions in Comparative Examples 4 to 7. Also, the vulcanized rubber compositions in Examples 9 to 16 were found to have a small value of tan δ and thus contribute to high fuel economy of a tire.

Next, chemical agents used in Preparations 1 to 3, Examples 17 to 25, and Comparative Examples 8 to 13 are listed below.

of NaOH and then saponified for 24 hours at room temperature. The resultant latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Thereby, a saponification-treated natural rubber latex was produced.

The natural rubbers obtained from the respective saponification-treated natural rubber latexes in Preparations 1 to 3 were subjected to the determination of the phosphorus content and the $^{31}$P-NMR determination of phosphorus in the same manner as the above described manner.

Example 17

Production of Graft-Copolymerized Natural Rubber

An amount of 600 g of the saponification-treated natural rubber latex (solid content: 25%) produced in Preparation 1 was placed into a four-neck flask that had a stirrer, a dropping funnel, a nitrogen inlet tube, and a condenser. While being slowly stirred under a nitrogen atmosphere, the latex was added, at one time, with 0.92 g of a nonionic emulsifier (EMULGEN430 produced by Kao Corporation) that had been dissolved in 250 ml of distilled water. Next, the latex was further added with 91.6 g of methyl methacrylate and stirred vigorously for a few seconds such that the respective chemical agents were mixed well. The mixture was then added with 1.43 g of tert-butyl hydroperoxide (polymerization initiator) that had been dissolved in 50 ml of distilled water, and 15.0 g of tetraethylenepentamine, and they were reacted for three hours at 30° C. As was coagulated after the reaction, the latex was subjected to extraction with petroleum ether and then to extraction with a 2:1 mixed solvent of acetone and methanol so that an unreacted natural rubber, a homopolymer, and a graft-copolymerized polymer were separated. Each separated fraction was confirmed to contain a single species by FT-IR and NMR spectrometers.

Examples 18 and 19

Production of Graft-Copolymerized Natural Rubber

Each graft-copolymerized polymer was produced by the same procedure as that in Example 17 except that the saponification-treated natural rubber latex (solid content: 25%) produced in Preparation 2 and the saponification-treated natural rubber latex (solid content: 25%) produced in Preparation 3 were respectively used in Examples 18 and 19.

Comparative Example 8

Production of Graft-Copolymerized Natural Rubber

A graft-copolymerized polymer was produced by the same procedure as that in Example 17 except that HA-type latex produced by Guthrie (Malaysia) was used after being diluted to a solid content of 25%.

Comparative Example 9

Production of Graft-Copolymerized Natural Rubber

A graft-copolymerized polymer was produced by the same procedure as that in Example 17 except that natural rubber latex (solid content: 61%) produced by Guthrie (Malaysia) was used after being diluted to a solid content of 30%, condensed to a solid content of 60%, and then diluted again to a solid content of 25%.

The degree of grafting (criterion for the degree of polymerization) and the grafting efficiency of the graft-copolymerized polymers produced in the respective Examples and Comparative Examples were determined in accordance with the following formulas, respectively.

Degree of grafting=(Mass of graft-polymerized monomers(g))/(Mass of main chain polymer(g))×100

Grafting efficiency=(Mass of graft-polymerized monomers(g))/(Total mass of polymerized monomers(g))×100

Table 3 shows the determined degree of grafting and grafting efficiency of each graft-copolymerized polymer, together with the phosphorus content of each natural rubber used.

TABLE 3

| | Phosphorus content(ppm) | Degree of grafting (%) | Grafting efficiency (%) |
|---|---|---|---|
| Example 17 | 98 | 35.4 | 68.3 |
| Example 18 | 64 | 34.2 | 69.2 |
| Example 19 | 120 | 32.7 | 61.2 |
| Comparative Example 8 | 560 | 22.7 | 56.7 |
| Comparative Example 9 | 331 | 21.2 | 54.3 |

Table 3 shows that the natural rubbers obtained from the saponification-treated natural rubber latexes produced in Preparations 1 to 3 each contained 200 ppm or less of phosphorus. The graft-copolymerized natural rubbers in Examples 17 to 19, which were produced from the saponification-treated natural rubber latexes, showed a higher degree of grafting and higher grafting efficiency than those of the graft-copolymerized natural rubbers in Comparative Examples 8 and 9, which were not produced from the saponification-treated natural rubber latex.

Further, each of the saponification-treated natural rubber latexes produced in Preparations 1 to 3 showed no peak corresponding to phospholipids between −3 ppm and 1 ppm in a $^{31}$P-NMR spectrum of an extract of the latex.

Example 20

Production of Natural Rubber Added with Organic Compound

An amount of 600 g of the saponification-treated natural rubber latex (solid content: 25%) produced in Preparation 1 was placed into a three-neck flask that had a stirrer, a dropping funnel, and a condenser. While being slowly stirred, the latex was added with 5.4 g of a nonionic emulsifier (EMULGEN106 produced by Kao Corporation) that had been dissolved in 300 ml of distilled water. Next, the mixture was added with 20 g of aminoethanethiol and was further stirred. Then, the mixture was irradiated with 500 W of microwaves for one hour, whereby the addition reaction was allowed to proceed.

Examples 21 and 22

Production of Natural Rubber Added with Organic Compound

Each natural rubber added with aminoethanethiol was produced by the same procedure as that in Example 20 except that the saponification-treated natural rubber latex (solid content: 25%) produced in Preparation 2 and the saponification-treated natural rubber latex (solid content: 25%) produced in Preparation 3 were respectively used in Examples 21 and 22.

Comparative Example 10

Production of Natural Rubber Added with Organic Compound

A natural rubber added with aminoethanethiol was produced by the same procedure as that in Example 20 except that HA-type latex produced by Guthrie (Malaysia) was used after being diluted to a solid content of 25%.

Comparative Example 11

Production of Natural Rubber Added with Organic Compound

A natural rubber added with aminoethanethiol was produced by the same procedure as that in Example 20 except that natural rubber latex (solid content: 61%) produced by Guthrie (Malaysia) was used after being diluted to a solid content of 30%, condensed to a solid content of 60%, and then diluted again to a solid content of 25%.

The degree of addition reaction ([mass of added organic compounds (g)]/[mass of main chain polymer (g)]) in the above Examples and Comparative Examples was determined.

Table 4 shows the determined degree of addition reaction, together with the phosphorus content of each natural rubber used.

TABLE 4

|  | Phosphorus content (ppm) | Degree of addition reaction (%) |
| --- | --- | --- |
| Example 20 | 98 | 6.4 |
| Example 21 | 64 | 6.8 |
| Example 22 | 120 | 6.1 |
| Comparative Example 10 | 560 | 3.6 |
| Comparative Example 11 | 331 | 4.1 |

Table 4 shows that the natural rubbers added with aminoethanethiol in Examples 20 to 22, which were produced from the saponification-treated natural rubber latexes, exhibited a higher degree of addition reaction than those of the natural rubbers added with aminoethanethiol in Comparative Examples 10 and 11, which were not produced from the saponification-treated natural rubber latex.

Example 23

Production of Epoxidized Natural Rubber

An amount of 600 g of the saponification-treated natural rubber latex (solid content: 25%) produced in Preparation 1 was placed into a three-neck flask that had a stirrer, a dropping funnel, and a condenser. While being slowly stirred, the latex was added with 5.4 g of a nonionic emulsifier (EMULGEN106 produced by Kao Corporation) that had been dissolved in 300 ml of distilled water. Next, the mixture was added with acetic acid to make the pH neutral. The mixture was heated to 40° C. and added with 30.6 g of formic acid while being stirred. Then, the mixture was further heated to 50° C. and added with 166.8 g of hydrogen peroxide (39% aqueous solution) over 20 minutes. After that, the mixture was reacted for five hours at room temperature, whereby an epoxidized natural rubber was produced.

Examples 24 and 25

Production of Epoxidized Natural Rubber

Each epoxidized natural rubber was produced by the same procedure as that in Example 23 except that the saponification-treated natural rubber latex (solid content: 25%) produced in Preparation 2 and the saponification-treated natural rubber latex (solid content: 25%) produced in Preparation 3 were respectively used in Examples 24 and 25.

Comparative Example 12

Production of Epoxidized Natural Rubber

An epoxidized natural rubber was produced by the same procedure as that in Example 23 except that HA-type latex produced by Guthrie (Malaysia) was used after being diluted to a solid content of 25%.

Comparative Example 13

Production of Epoxidized Natural Rubber

An epoxidized natural rubber was produced by the same procedure as that in Example 23 except that natural rubber latex (solid content: 61%) produced by Guthrie (Malaysia) was used after being diluted to a solid content of 30%, condensed to a solid content of 60%, and then diluted again to a solid content of 25%.

The degree of epoxidation of the epoxidized rubbers produced in the respective Examples and Comparative Examples was determined with FT-IR and $^{13}$C-NMR. The determination was performed in accordance with "Chemical Demonstration of the Randomness of Epoxidized Natural Rubber", Br. Polym. J., 1984, 16, 134 (Davey et al.). Furthermore, after three hours from initiation of the reaction, the degree of epoxidation of double bonds was determined in order to compare the reaction rates of the rubbers.

Table 5 shows the determination results of the degree of epoxidation of the epoxidized rubbers produced in the respective Examples and Comparative Examples, together with the phosphorus contents of the respective natural rubbers used.

TABLE 5

|  | Phosphorus content (ppm) | Degree of epoxidation (%) |
| --- | --- | --- |
| Example 23 | 98 | 36.3 |
| Example 24 | 64 | 38.1 |
| Example 25 | 120 | 29.7 |
| Comparative Example 12 | 560 | 24.3 |
| Comparative Example 13 | 331 | 24.1 |

Table 5 shows that the epoxidized natural rubbers in Examples 23 to 25, which were produced from the saponification-treated natural rubber latexes, exhibited a higher degree of epoxidation than those of the epoxidized natural rubbers in Comparative Examples 12 and 13, which were not produced from the saponification-treated natural rubber latex.

Next, chemical agents used in Preparations 4 to 6, Examples 26 to 37, and Comparative Examples 14 to 21 are listed below.
Natural rubber latex: field latex obtained from Thaitex
Surfactant: Emal-E produced by Kao Corporation
NaOH: NaOH produced by Wako Pure Chemical Industries, Ltd.
Natural rubber: TSR
SBR (1): NS116 (vinyl content: 60% by mass, styrene content: 20% by mass) produced by JSR Corporation SBR (2): Nipol1502 (emulsion-polymerized styrene butadiene rubber (E-SBR), styrene content: 23.5% by mass) produced by Zeon Corporation
Carbon black (1): N220 ($N_2SA$: 120 $m^2/g$, DBP oil absorption: 114 ml/100 g) produced by Cabot Japan K.K.
Carbon black (2): DIABLACK H(N330, $N_2SA$: 79 $m^2/g$, DBP oil absorption: 100 ml/100 g) produced by Mitsubishi Chemical Corporation
Silica: ZEOSIL 115GR (BET: 115 $m^2/g$) produced by Rhodia
Silane coupling agent: Si266 (bis(3-triethoxysilylpropyl)disulfide) produced by Degussa AG
Oil: Process X-140 produced by Japan Energy Corporation
Zinc oxide: Zinc oxide #1 produced by Mitsui Mining & Smelting Co., Ltd.
Stearic acid: "TSUBAKI" produced by NOF Corporation
Age resistor: Antigene 6C (N-(1,3-dimethylbutyl)-N'-phenyl-p-phenylenediamine) produced by Sumitomo Chemical Co., Ltd.
Sulfur: sulfur powder produced by Tsurumi Chemical Industry Co., Ltd.
Vulcanization accelerator (1): NOCCELER NS(N-tert-butyl-2-benzothiazolyl sulfenamide) produced by Ouchi Shinko Chemical Industrial Co., Ltd.
Vulcanization accelerator (2): NOCCELER D (N,N'-diphenylguanidine) produced by Ouchi Shinko Chemical Industrial Co., Ltd.
Peptizer: NOCTIZER SD produced by Ouchi Shinko Chemical Industrial Co., Ltd.
(Production of Natural Rubber Saponified with Alkali)
Preparation 4
The solid content (DRC) of natural rubber latex was adjusted to 30% (w/v). Next, 1000 g of the natural rubber latex was added with 10 g of Emal-E and 20 g of NaOH and then saponified for 48 hours at room temperature, whereby a saponified natural rubber latex was produced. The saponified latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Then, the rubber was dried for two hours at 110° C., and thereby a solid rubber (saponified natural rubber A) was produced.
Preparation 5
The solid content (DRC) of natural rubber latex was adjusted to 30% (w/v). Next, 1000 g of the natural rubber latex was added with 10 g of Emal-E and 15 g of NaOH and then saponified for 48 hours at room temperature, whereby a saponified natural rubber latex was produced. The saponified latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Then, the rubber was dried for two hours at 110° C., and thereby a solid rubber (saponified natural rubber B) was produced.
Preparation 6
The solid content (DRC) of natural rubber latex was adjusted to 30% (w/v). Next, the natural rubber latex was added with formic acid, while being slowly stirred, so that the pH was adjusted to 4.0 to 4.5. The rubber was coagulated, and the coagulated rubber was broken up and dried for two hours at 110° C., and thereby a solid rubber (untreated natural rubber) was produced.

The nitrogen content, phosphorus content, and gel content of each of TSR and the solid rubbers produced in Preparations 4 to 6 were determined by the same methods as those described above. Table 6 shows the results obtained.

TABLE 6

|  | Saponified natural rubber A (Preparation 4) | Saponified natural rubber B (Preparation 5) | Untreated natural rubber (Preparation 6) | TSR |
|---|---|---|---|---|
| Nitrogen content (% by mass) | 0.12 | 0.25 | 0.32 | 0.33 |
| Phosphorus content (ppm) | 84 | 123 | 359 | 572 |
| Gel content (% by mass) | 5.5 | 14.2 | 25.3 | 26.9 |

Table 6 shows that the saponified natural rubbers A and B each had more reduced nitrogen content, phosphorus content, and gel content than those of the untreated natural rubber and TSR.

Production 1 of Rubber Test Sample and Tire

Examples 26 to 31, Comparative Examples 14 to 17

In accordance with each formulation shown in Tables 7 and 8, the chemical agents other than the sulfur and the vulcanization accelerator were mixed by a 1.7-L Banbury mixer. Thereafter, the sulfur and the vulcanization accelerator were added to the resultant mixture, and they were mixed by an open roll mill. Thereby, an unvulcanized rubber composition was produced. Note that in Comparative Examples 14 and 16 where TSR was used, the peptizer was added in an amount of 0.4 parts by mass per 100 parts by mass of the rubber component of TSR, and the mixture was masticated by a 1.7-L Banbury mixer beforehand. On the other hand, the natural rubbers in Examples 26 to 31 and Comparative Examples 15 and 17 were not masticated.

Then, the unvulcanized rubber composition produced thereby was molded into the shape of a tread on a tire building machine and assembled with other tire components, so that an unvulcanized tire was formed. The unvulcanized tire was then vulcanized for 30 minutes at 150° C., and thereby a test tire was produced.

Production 2 of Rubber Test Sample and Tire

Examples 32 to 37, Comparative Examples 18 to 21

In accordance with each formulation shown in Tables 9 and 10, the chemical agents other than the sulfur and the vulcanization accelerator were mixed by a 1.7-L Banbury mixer. Thereafter, the sulfur and the vulcanization accelerator were added to the resultant mixture, and they were mixed by an open roll mill. Thereby, an unvulcanized rubber composition was produced. Note that in Comparative Examples 18 and 20 where TSR was used, the peptizer was added in an amount of 0.4 parts by mass per 100 parts by mass of the rubber component of TSR, and the mixture was masticated by a 1.7-L Banbury mixer beforehand. On the other hand, the natural rubbers in Examples 32 to 37 and Comparative Examples 19 and 21 were not masticated.

Then, the unvulcanized rubber composition produced thereby was press-vulcanized for 15 minutes at 170° C., whereby a vulcanized rubber composition was produced.

Also, the unvulcanized rubber composition produced thereby was arranged to cover a carcass cord. The resultant unvulcanized rubber composition with a carcass cord was molded into the shape of a carcass on a tire building machine and assembled with other tire components, so that an unvulcanized tire was formed. The unvulcanized tire was then vulcanized for 30 minutes at 150° C., and thereby a test tire was produced.

The produced unvulcanized rubber compositions, vulcanized rubber compositions, and test tires were evaluated in the following ways. Tables 7 to 10 show the evaluation results.

(Determination of Mooney Viscosity)

The Mooney viscosity of the produced unvulcanized rubber compositions was determined at 130° C. in accordance with the determination method of Mooney viscosity specified in JIS K6300. The Mooney viscosity ($ML_{1+4}$) of each of the unvulcanized rubber compositions was used in the following calculation formula to calculate the Mooney viscosity index. The resultant index is relative to the Mooney viscosity index of Comparative Example 14, Comparative Example 16, Comparative Example 18, or Comparative Example 20 (=100). The larger the index, the lower the Mooney viscosity, which indicates more excellent processability.

(Mooney viscosity index)=($ML_{1+4}$ of Comparative Example 14,Comparative Example 16,Comparative Example 18,or Comparative Example 20)/($ML_{1+4}$ of each unvulcanized rubber composition)×100

(Rolling Resistance)

Each of the test tires was mounted on a rim (15×6 JJ), and the rolling resistance thereof during running was determined with a rolling resistance tester, under the conditions of a tire internal pressure of 230 kPa, a load of 3.43 kN, and a speed of 80 km/h. The rolling resistance of each of the test tires was used in the following calculation formula to calculate the rolling resistance index. The resultant index is relative to the rolling resistance index of Comparative Example 14, Comparative Example 16, Comparative Example 18, or Comparative Example 20 (=100). The larger the rolling resistance index, the more the rolling resistance is decreased, which indicates more excellent fuel economy.

(Rolling resistance index)=(Rolling resistance of Comparative Example 14,Comparative Example 16,Comparative Example 18,or Comparative Example 20)/(Rolling resistance of each test tire)×100

(Abrasion Test)

The test tires of Examples 26 to 31 and Comparative Examples 14 to 17 each were mounted on a vehicle, and the vehicle ran 8000 km in a city area. Thereafter, the depth of grooves of the tire was measured to determine the amount of decrease in groove depth after the run. The determined amount of decrease in groove depth of each test tire was used in the following calculation formula to calculate the abrasion resistance index. The resultant index is relative to the abrasion resistance index of Comparative Example 14 or Comparative Example 16 (=100). The larger the abrasion resistance index, the better the abrasion resistance.

(Abrasion resistance index)=(Amount of decrease in groove depth in Comparative Example 14 or Comparative Example 16)/(Amount of decrease in groove depth of each test tire)×100

(Rubber Strength)

A No. 3 dumbbell-shaped rubber sample was prepared from each of the produced vulcanized rubber composition sheets of Examples 32 to 37 and Comparative Examples 18 to 21. Each sample was subjected to the tensile test in accordance with JIS K 6251 "Rubber, vulcanized or thermoplastic—Determination of tensile stress-strain properties". In the test, the tensile strength at break (TB) and elongation at break (EB) of the sample were determined, and the product thereof (TB×EB) was calculated. The calculated product (TB×EB) was used in the following calculation formula to calculate the rubber strength index. The resultant index is relative to the rubber strength index of Comparative Example 18 or Comparative Example 20 (=100). The larger the rubber strength index, the higher the rubber strength.

(Rubber strength index)=(TB×EB of each sample)/(TB×EB of Comparative Example 18 or Comparative Example 20)×100

(Adhesion Test)

The produced unvulcanized rubber compositions in Examples 32 to 37 and Comparative Examples 18 to 21 each were attached to a carcass cord and vulcanized for 40 minutes at 180° C. Then, the resultant vulcanized rubber composition with a carcass cord was put on a tensile strength tester (produced by Instron) and the adhesion between the rubber composition and the carcass cord was visually evaluated.

Good: high adhesion between rubber sheet and carcass cord
Poor: low adhesion between rubber sheet and carcass cord

TABLE 7

| Rubber composition for tire tread | | | | | |
|---|---|---|---|---|---|
| | Example 26 | Example 27 | Example 28 | Comparative Example 14 | Comparative Example 15 |
| Saponified natural rubber A (Preparation 4) | 30 | N/A | 20 | N/A | N/A |
| Saponified natural rubber B (Preparation 5) | N/A | 30 | N/A | N/A | N/A |
| Untreated natural rubber (Preparation 6) | N/A | N/A | N/A | N/A | 30 |
| TSR | N/A | N/A | N/A | 30 | N/A |
| SBR (1) (NS116) | 70 | 70 | 80 | 70 | 70 |
| Carbon black (1) (N220) | 50 | 50 | 50 | 50 | 50 |
| Zinc oxide | 3 | 3 | 3 | 3 | 3 |

TABLE 7-continued

Rubber composition for tire tread

|  | Example 26 | Example 27 | Example 28 | Comparative Example 14 | Comparative Example 15 |
|---|---|---|---|---|---|
| Stearic acid | 2 | 2 | 2 | 2 | 2 |
| Age resistor | 1.5 | 1.5 | 1.5 | 1.5 | 1.5 |
| Sulfur | 1.5 | 1.5 | 1.5 | 1.5 | 1.5 |
| Vulcanization accelerator (1) | 1 | 1 | 1 | 1 | 1 |
| Mooney viscosity index | 116 | 113 | 108 | 100 | 83 |
| Rolling resistance index | 112 | 110 | 110 | 100 | 102 |
| Abrasion resistance index | 116 | 114 | 112 | 100 | 109 |

Table 7 shows that the rubber compositions for a tire tread in Examples 26 to 28, each of which contained the saponified natural rubber, had higher processability than that of the rubber composition for a tire tread of Comparative Example 14 which contained the masticated TSR. On the other hand, the untreated natural rubber of Comparative Example 15, which was not masticated, caused poor processability. As just described, the rubber compositions containing the saponified natural rubber showed excellent processability even without mastication. Further, the rubber compositions of Examples had higher fuel economy and higher abrasion resistance than those of the rubber compositions of Comparative Examples.

TABLE 8

Rubber composition for tire tread

|  | Example 29 | Example 30 | Example 31 | Comparative Example 16 | Comparative Example 17 |
|---|---|---|---|---|---|
| Saponified natural rubber A (Preparation 4) | 30 | N/A | 20 | N/A | N/A |
| Saponified natural rubber B (Preparation 5) | N/A | 30 | N/A | N/A | N/A |
| Untreated natural rubber (Preparation 6) | N/A | N/A | N/A | N/A | 30 |
| TSR | N/A | N/A | N/A | 30 | N/A |
| SBR (1) (NS116) | 70 | 70 | 80 | 70 | 70 |
| Carbon black (1) (N220) | 20 | 20 | 20 | 20 | 20 |
| Silica | 50 | 50 | 50 | 50 | 50 |
| Silane coupling agent | 4 | 4 | 4 | 4 | 4 |
| Oil | 20 | 20 | 20 | 20 | 20 |
| Zinc oxide | 3 | 3 | 3 | 3 | 3 |
| Stearic acid | 2 | 2 | 2 | 2 | 2 |
| Age resistor | 1.5 | 1.5 | 1.5 | 1.5 | 1.5 |
| Sulfur | 1.5 | 1.5 | 1.5 | 1.5 | 1.5 |
| Vulcanization accelerator (1) | 1 | 1 | 1 | 1 | 1 |
| Vulcanization accelerator (2) | 0.5 | 0.5 | 0.5 | 0.5 | 0.5 |
| Mooney viscosity index | 117 | 116 | 111 | 100 | 88 |
| Rolling resistance index | 110 | 107 | 107 | 100 | 101 |
| Abrasion resistance index | 118 | 114 | 115 | 100 | 110 |

Table 8 shows that even in the case of the rubber composition for a tread which contained both silica and carbon black, the rubber compositions of Examples 29 to 31, each of which contained the saponified natural rubber, had higher processability than that of the rubber composition of Comparative Example 16 which contained the masticated TSR. On the other hand, the rubber composition of Comparative Example 17, which contained the untreated (unmasticated) natural rubber, had poor processability. Further, the rubber compositions of Examples had higher fuel economy and higher abrasion resistance than those of the rubber compositions of Comparative Examples.

TABLE 9

Rubber composition for covering carcass cord

| | Example 32 | Example 33 | Example 34 | Comparative Example 18 | Comparative Example 19 |
|---|---|---|---|---|---|
| Saponified natural rubber A (Preparation 4) | 70 | N/A | 80 | N/A | N/A |
| Saponified natural rubber B (Preparation 5) | N/A | 70 | N/A | N/A | N/A |
| Untreated natural rubber (Preparation 6) | N/A | N/A | N/A | N/A | 70 |
| TSR | N/A | N/A | N/A | 70 | N/A |
| SBR (2) (SBR1502) | 30 | 30 | 20 | 30 | 30 |
| Carbon black (2) (N330) | 50 | 50 | 50 | 50 | 50 |
| Zinc oxide | 5 | 5 | 5 | 5 | 5 |
| Stearic acid | 2 | 2 | 2 | 2 | 2 |
| Sulfur | 3 | 3 | 3 | 3 | 3 |
| Vulcanization accelerator (1) | 1 | 1 | 1 | 1 | 1 |
| Mooney viscosity index | 120 | 117 | 122 | 100 | 81 |
| Rubber strength index | 115 | 112 | 118 | 100 | 97 |
| Adhesion | Good | Good | Good | Good | Poor |
| Rolling resistance index | 117 | 115 | 117 | 100 | 98 |

Table 9 shows that the rubber compositions for covering a carcass cord in Examples 32 to 34, each of which contained the saponified natural rubber, had better processability and higher rubber strength than those of the rubber composition of Comparative Example 18, which contained the masticated TSR, and than those of the rubber composition of Comparative Example 19, which contained the untreated (unmasticated) natural rubber. Further, the rubber compositions of Examples showed higher adhesion than that of the rubber composition of Comparative Example 19 and also had higher fuel economy than those in Comparative Examples 18 and 19.

TABLE 10

Rubber composition for covering carcass cord

| | Example 35 | Example 36 | Example 37 | Comparative Example 20 | Comparative Example 21 |
|---|---|---|---|---|---|
| Saponified natural rubber A (Preparation 4) | 70 | N/A | 80 | N/A | N/A |
| Saponified natural rubber B (Preparation 5) | N/A | 70 | N/A | N/A | N/A |
| Untreated natural rubber (Preparation 6) | N/A | N/A | N/A | N/A | 70 |
| TSR | N/A | N/A | N/A | 70 | N/A |
| SBR (2) (SSR1502) | 30 | 30 | 20 | 30 | 30 |
| Silica | 50 | 50 | 50 | 50 | 50 |
| Silane coupling agent | 4 | 4 | 4 | 4 | 4 |
| Carbon black (1) (N220) | 5 | 5 | 5 | 5 | 5 |
| Zinc oxide | 5 | 5 | 5 | 5 | 5 |
| Stearic acid | 2 | 2 | 2 | 2 | 2 |
| Sulfur | 3 | 3 | 3 | 3 | 3 |
| Vulcanization accelerator (1) | 1 | 1 | 1 | 1 | 1 |
| Vulcanization accelerator (2) | 0.5 | 0.5 | 0.5 | 0.5 | 0.5 |
| Mooney viscosity index | 119 | 117 | 119 | 100 | 95 |
| Rubber strength index | 123 | 119 | 127 | 100 | 102 |
| Adhesion | Good | Good | Good | Poor | Poor |
| Rolling resistance index | 112 | 110 | 110 | 100 | 102 |

Table 10 shows that even in the case of the rubber composition for covering a carcass cord which contained both silica and carbon black, the rubber compositions of Examples 35 to 37, each of which contained the saponified natural rubber, had better processability and higher rubber strength than those of the rubber composition of Comparative Example 20, which contained the masticated TSR, and than those of the rubber composition of Comparative Example 21, which contained the untreated (unmasticated) natural rubber. Further, although the rubber compositions of Comparative Examples had poor adhesion, the rubber compositions containing the saponified natural rubber showed improved adhesion. Further, the rubber compositions of Examples had higher fuel economy than those of the rubber compositions of Comparative Examples.

The invention claimed is:

1. A natural rubber containing 200 ppm or less of phosphorus, based upon the solid content.
2. The natural rubber according to claim 1, wherein the natural rubber is produced by saponifying natural rubber latex with an alkali, and repeatedly washing a rubber coagulated therefrom after the saponification and removing a phosphorus compound separated in the saponification through the washing.

3. The natural rubber according to claim 1,
wherein the natural rubber contains 20% by mass or less of gel that is determined as a toluene-insoluble matter.

4. The natural rubber according to claim 1,
wherein the natural rubber shows no peak corresponding to phospholipids between −3 ppm and 1 ppm in a $^{31}$P-NMR spectrum of a chloroform extract thereof and thus substantially contains no phospholipids.

5. The natural rubber according to claim 1,
wherein the natural rubber contains 0.3% by mass or less of nitrogen.

6. The natural rubber according to claim 1,
wherein the natural rubber contains 0.15% by mass or less of nitrogen.

7. A method for producing the natural rubber according to claim 1, comprising the steps of:
saponifying natural rubber latex with an alkali;
repeatedly washing a rubber coagulated therefrom after the saponification; and
drying the rubber,
wherein the phosphorus content in the natural rubber from the natural rubber latex is reduced to 200 ppm or less by removing a phosphorus compound separated in the saponification through the washing, and these steps are completed within 15 days after extraction of the natural rubber latex.

8. The method for producing the natural rubber according to claim 7,
wherein the natural rubber contains 20% by mass or less of gel that is determined as a toluene-insoluble matter.

9. The method for producing the natural rubber according to claim 7,
wherein the natural rubber contains 0.3% by mass or less of nitrogen.

10. The method for producing the natural rubber according to claim 7,
wherein the natural rubber contains 0.15% by mass or less of nitrogen.

11. A rubber composition comprising:
the natural rubber according to claim 1; and
a vulcanizing agent.

12. A pneumatic tire produced using
the rubber composition according to claim 11.

13. A modified natural rubber,
which is modified by graft-copolymerizing a natural rubber containing 200 ppm or less of phosphorus therein, based upon the solid content with an organic compound that has an unsaturated bond.

14. A modified natural rubber,
which is modified by addition-reacting a thiol compound with a natural rubber that contains 200 ppm or less of phosphorus, based upon the solid content.

15. A modified natural rubber,
which is modified by epoxidizing a natural rubber that contains 200 ppm or less of phosphorus, based upon the solid content.

16. The modified natural rubber according to any one of claims 13-15,
wherein the natural rubber containing 200 ppm or less of phosphorus is produced by saponifying natural rubber latex with an alkali, and repeatedly washing a rubber coagulated therefrom after the saponification and removing a phosphorus compound separated in the saponification through the washing.

17. The modified natural rubber according to any one of claims 13-15,
wherein the modified natural rubber shows no peak corresponding to phospholipids between −3 ppm and 1 ppm in a $^{31}$P-NMR spectrum of a chloroform extract thereof and thus substantially contains no phospholipids.

18. A method for producing the modified natural rubber according to claim 13, the method comprising the steps of:
saponifying natural rubber latex with an alkali;
repeatedly washing a rubber coagulated therefrom after the saponification and removing a phosphorus compound separated in the saponification through the washing to produce a natural rubber containing 200 ppm or less of phosphorus; and
graft-copolymerizing the produced natural rubber with an organic compound that has an unsaturated bond.

19. A method for producing the modified natural rubber according to claim 14, the method comprising the steps of:
saponifying natural rubber latex with an alkali;
repeatedly washing a rubber coagulated therefrom after the saponification and removing a phosphorus compound separated in the saponification through the washing to produce a natural rubber containing 200 ppm or less of phosphorus; and
addition-reacting a thiol compound with the produced natural rubber.

20. A method for producing the modified natural rubber according to claim 15, the method comprising the steps of:
saponifying natural rubber latex with an alkali;
repeatedly washing a rubber coagulated therefrom after the saponification and removing a phosphorus compound separated in the saponification through the washing to produce a natural rubber containing 200 ppm or less of phosphorus; and
epoxidizing the produced natural rubber.

21. A rubber composition for a tire tread, comprising:
a rubber component with 5% by mass or more of a natural rubber that contains 200 ppm or less of phosphorus, based upon the solid content, and
carbon black and/or a white filler.

22. The rubber composition for a tire tread according to claim 21,
wherein the natural rubber is produced by saponifying natural rubber latex with an alkali, and repeatedly washing a rubber coagulated therefrom after the saponification and removing a phosphorus compound separated in the saponification through the washing.

23. The rubber composition for a tire tread according to claim 21,
wherein the natural rubber contains 0.3% by mass or less of nitrogen.

24. The rubber composition for a tire tread according to claim 21,
wherein the natural rubber contains 0.15% by mass or less of nitrogen.

25. The rubber composition for a tire tread according to claim 21,
wherein the natural rubber contains 20% by mass or less of gel that is determined as a toluene-insoluble matter.

26. The rubber composition for a tire tread according to claim 21,
wherein the white filler is silica.

27. A method for producing the rubber composition for a tire tread according to claim 21, the method excluding the step of masticating natural rubber.

28. A pneumatic tire comprising
a tread made with the rubber composition for a tire tread according to claim 21.

29. A rubber composition for covering a carcass cord, comprising:
a rubber component with 5% by mass or more of a natural rubber that contains 200 ppm or less of phosphorus, based upon the solid content, and
carbon black and/or a white filler.

30. The rubber composition for covering a carcass cord according to claim 29,
wherein the natural rubber is produced by saponifying natural rubber latex with an alkali, and repeatedly washing a rubber coagulated therefrom after the saponification and removing a phosphorus compound separated in the saponification through the washing.

31. The rubber composition for covering a carcass cord according to claim 29,
wherein the natural rubber contains 0.3% by mass or less of nitrogen.

32. The rubber composition for covering a carcass cord according to claim 29,
wherein the natural rubber contains 0.15% by mass or less of nitrogen.

33. The rubber composition for covering a carcass cord according to claim 29,
wherein the natural rubber contains 20% by mass or less of gel that is determined as a toluene-insoluble matter.

34. The rubber composition for covering a carcass cord according to claim 29,
wherein the white filler is silica.

35. The rubber composition for covering a carcass cord according to claim 29,
wherein the natural rubber is contained in an amount of 60 to 100% by mass in 100% by mass of the rubber component.

36. The rubber composition for covering a carcass cord according to claim 29,
wherein the rubber composition contains 4 to 15 parts by mass of zinc oxide per 100 parts by mass of the rubber component.

37. A method for producing the rubber composition for covering a carcass cord according to claim 29, the method excluding the step of
masticating natural rubber.

38. A pneumatic tire comprising
a carcass made with the rubber composition for covering a carcass cord according to claim 29.

* * * * *